Nov. 10, 1959
W. K. BECKWITH
2,911,949
WRITING INSTRUMENT
Filed Jan. 10, 1955
6 Sheets-Sheet 1
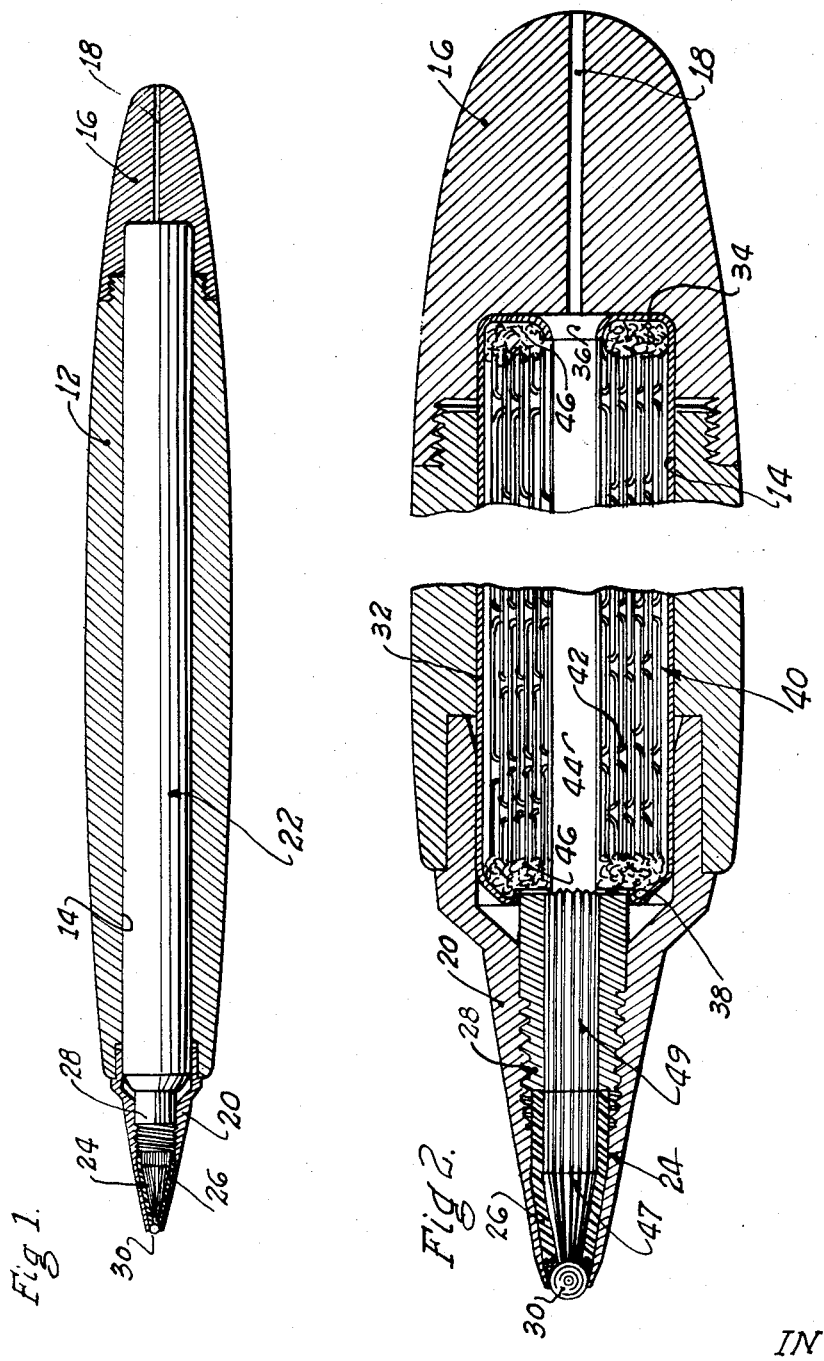
INVENTOR
WENDELL K. BECKWITH
BY Ivan D Tefft
ATTY Nov. 10, 1959 — W. K. BECKWITH — 2,911,949
WRITING INSTRUMENT
Filed Jan. 10, 1955 — 6 Sheets-Sheet 2
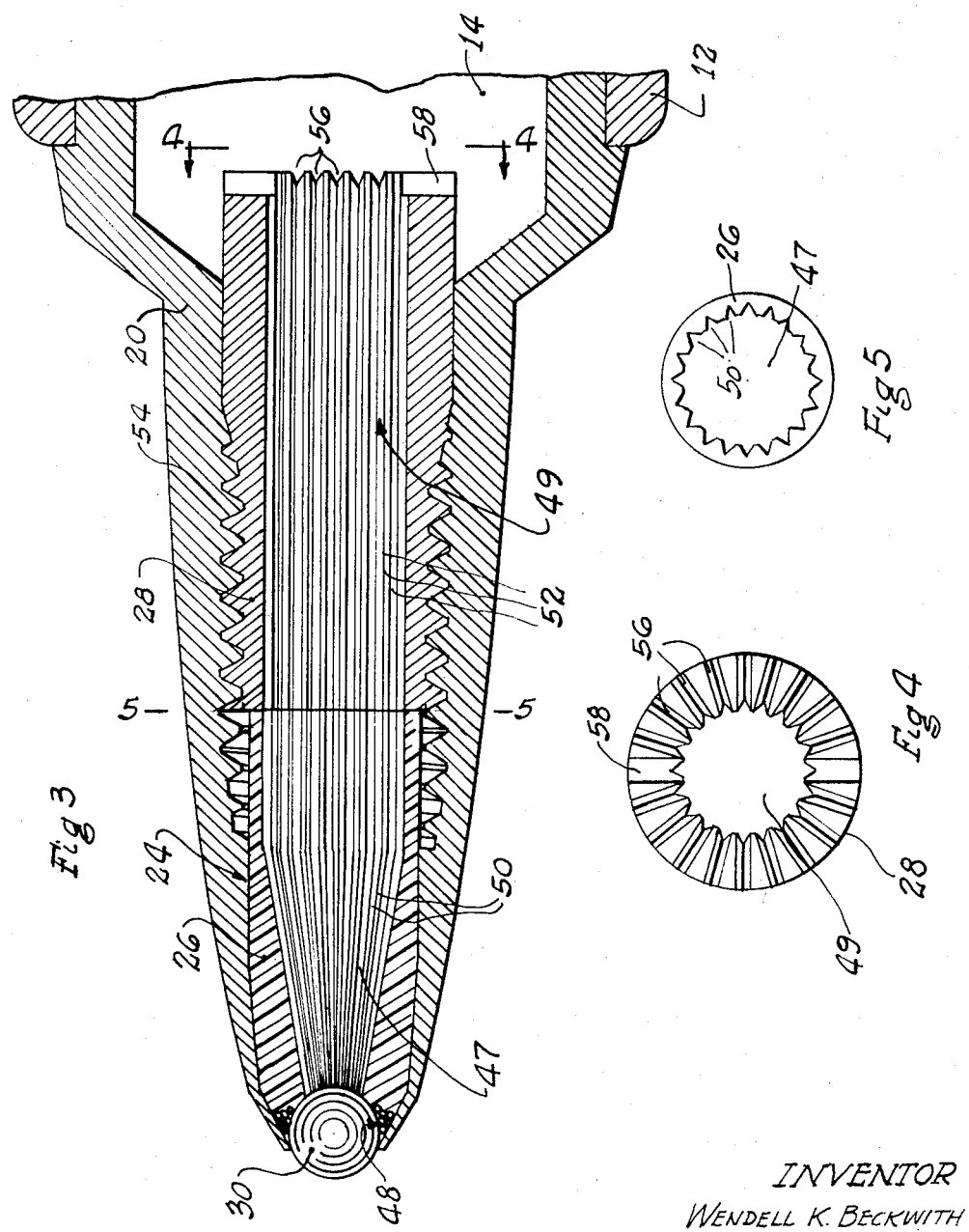
INVENTOR
WENDELL K. BECKWITH
BY Ivan D. Jefft
ATTY Nov. 10, 1959 W. K. BECKWITH 2,911,949
WRITING INSTRUMENT
Filed Jan. 10. 1955 6 Sheets-Sheet 3
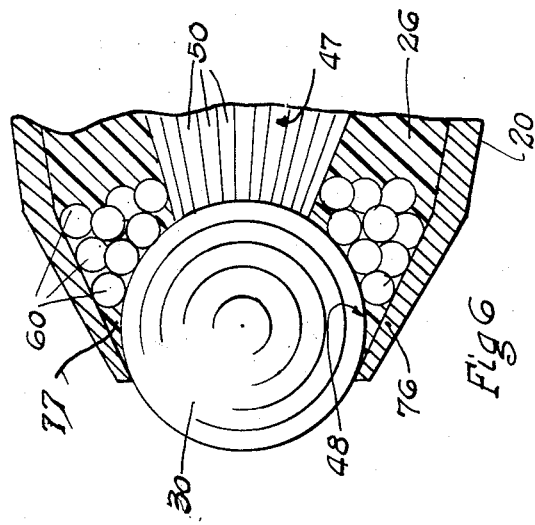
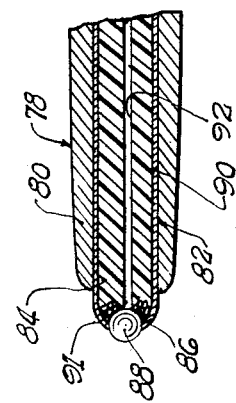
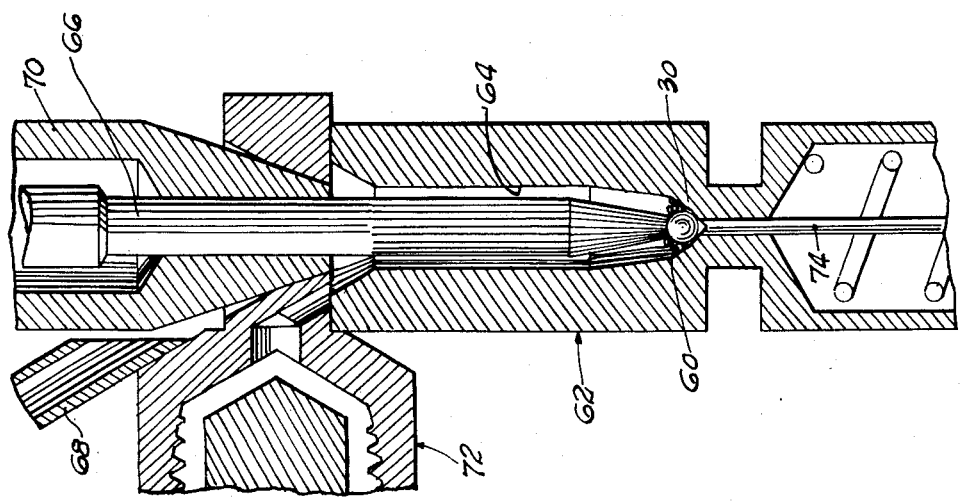
INVENTOR
WENDELL K. BECKWITH
BY
ATTY.

Nov. 10, 1959  W. K. BECKWITH  2,911,949
WRITING INSTRUMENT
Filed Jan. 10, 1955  6 Sheets-Sheet 4
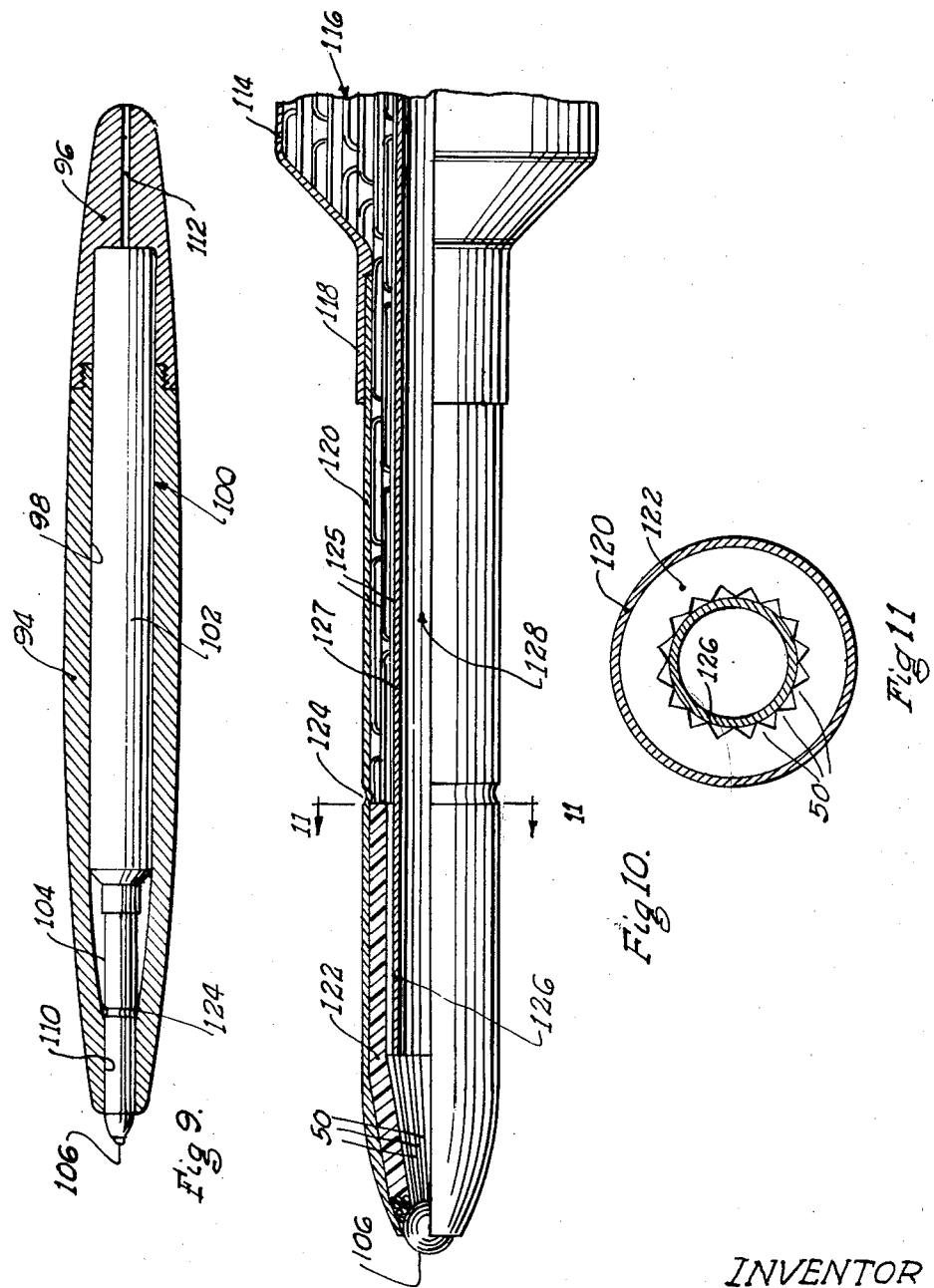
INVENTOR
WENDELL K. BECKWITH
BY Ivan D. Jefft
ATTY.

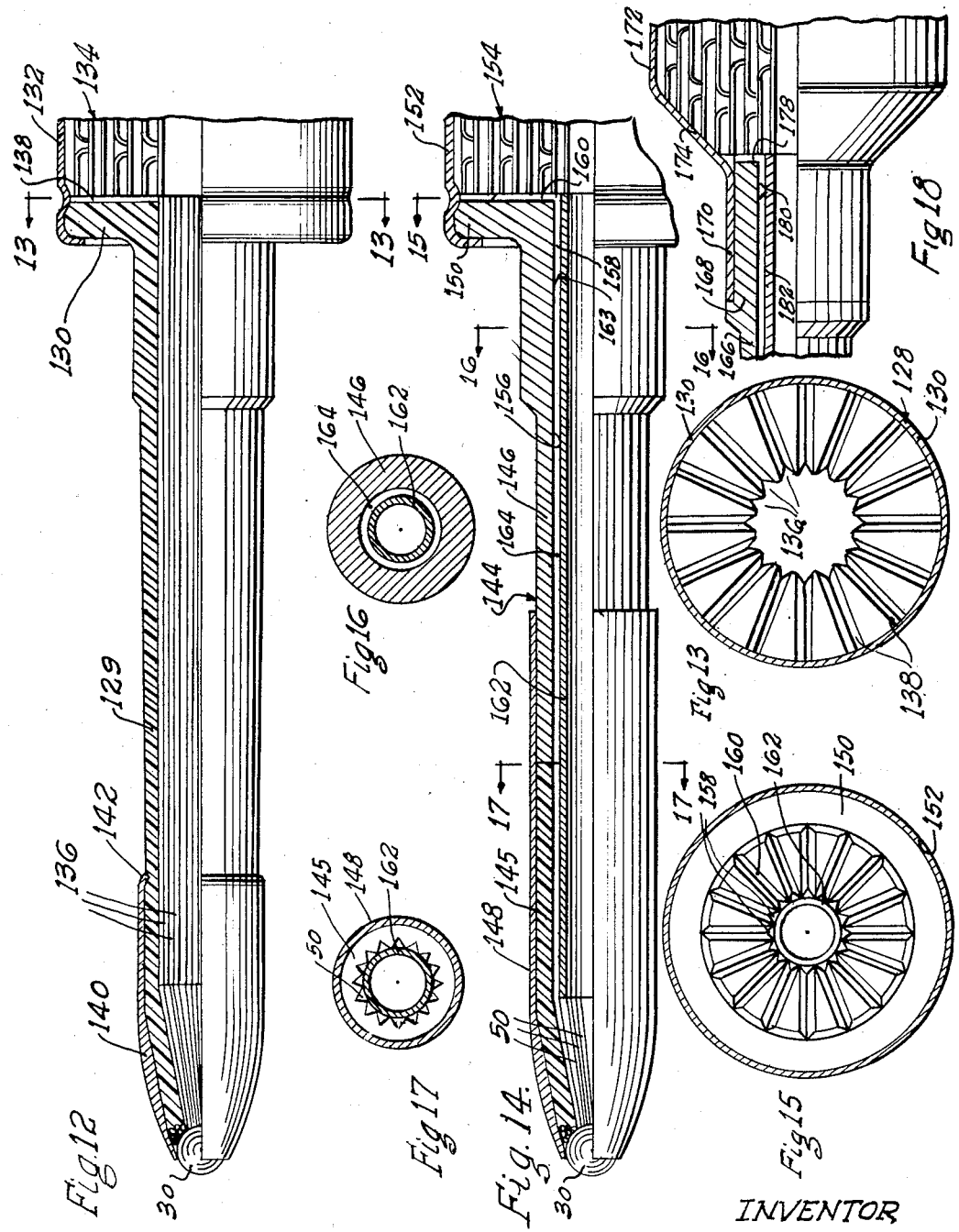

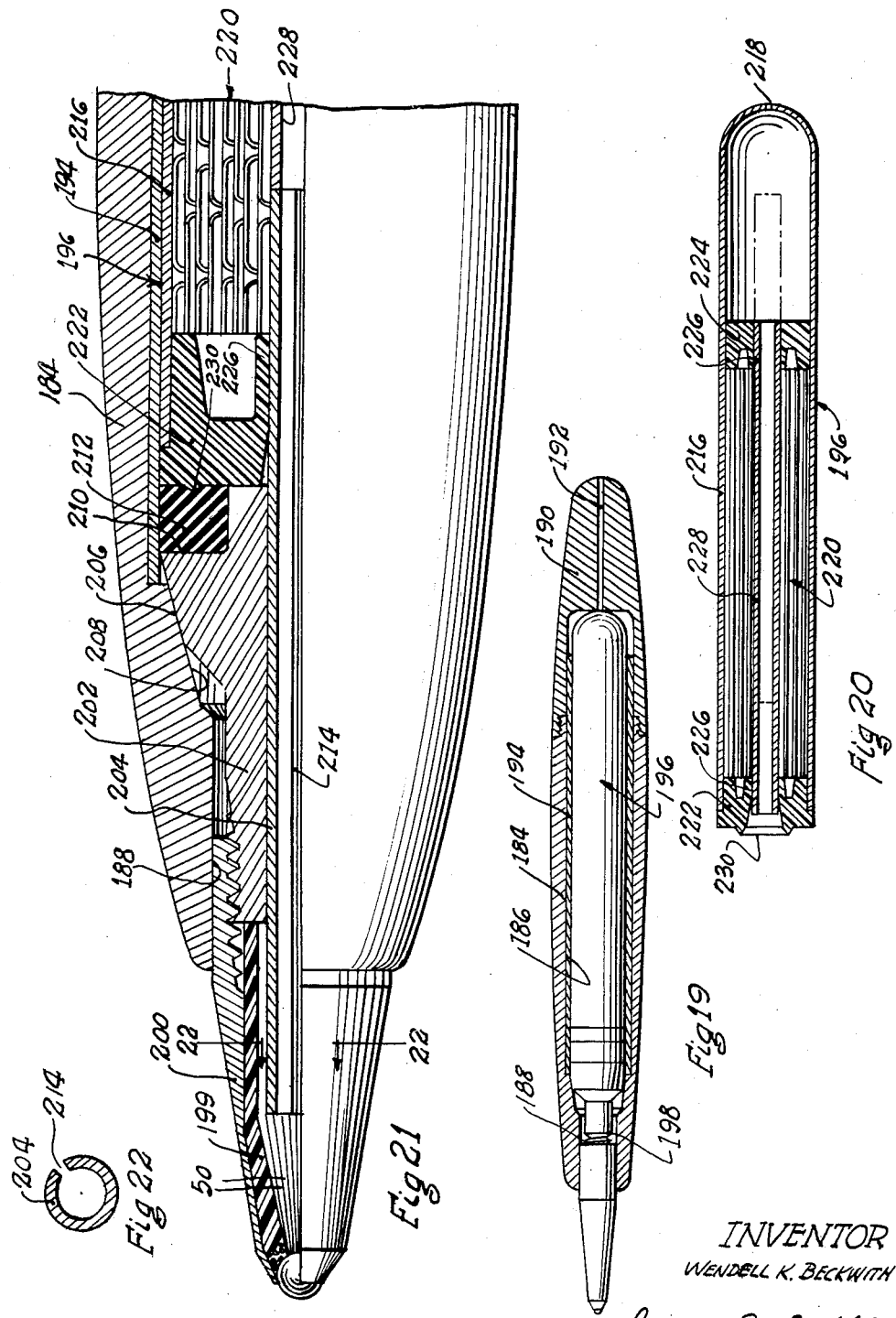

United States Patent Office 2,911,949
Patented Nov. 10, 1959

2,911,949

WRITING INSTRUMENT

Wendell K. Beckwith, Whitewater, Wis., assignor to The Parker Pen Company, Janesville, Wis., a corporation of Wisconsin Application January 10, 1955, Serial No. 480,963

3 Claims. (Cl. 120—42.4)

The present invention relates to writing instruments, and more particularly to writing instruments of the ball point type.

An object of the invention is to provide a ball point writing instrument having a novel writing ball and seat.

A more specific object is to provide a seat member, in which the ball seat is formed, of easily moldable material, having a specially treated portion forming the seat.

Another object is to provide a novel pitted-surface writing ball and seat for a ball point writing instrument.

Another object is to provide a seat member of the foregoing character, in which a low melting point material is utilized for forming the mass of the member, and particles of high melting point material are embedded therein to form the ball seat portion, with the result that a pitted seat surface is provided, the seat member is reinforced, and other advantages are attained.

A further object is to provide a novel method of forming a ball seat member for a ball point writing instrument.

A further object is to provide a novel seat member for a writing ball which can be easily formed to the same ball that is to be used therein.

Another object is to provide in a ball point pen, a seat member having a limited degree of resilience.

A further object is to provide in a ball point pen, a seat member having a limited degree of resilience and having a lip portion extending beyond the equator of the ball, whereby the lip portion yields and retracts to snug fitting engagement with the ball so that it continues to produce a metering effect on the ink on the ball notwithstanding the tendency of the seat to be lapped to a diameter greater than that of the ball.

Still another object is to provide a ball point pen in which gooping and weeping are eliminated.

Another object is to provide an inexpensive seat member for a ball point pen.

Another object is to provide a novel ball point writing instrument in which thin liquid ink is utilized and the instrument is of capillary nature, that is, a reservoir element is provided which constitutes substantially the sole means for containing a supply of ink in the instrument and fills by capillary action, and retains the ink therein by capillary action except in a writing operation when the ink feeds therefrom to the writing ball by capillary action.

A further object is to provide a capillary ball point writing instrument having novel means for feeding ink by capillary action from the reservoir element to the writing ball.

Still another object is to provide a capillary ball point writing instrument with a removable and replaceable reservoir element wherein novel means is provided for establishing ink feeding relation between the reservoir element and writing ball, effective upon merely inserting the reservoir element into the instrument.

Another object is to provide a ball point writing instrument in which the inner surface of the writing ball is constantly vented to the exterior.

A further object is to provide a capillary ball point writing instrument which utilizes thin liquid ink, wherein the inner surface of the writing ball is constantly vented to the exterior.

Another object is to provide a capillary ball point writing instrument having a removable and replaceable reservoir element in which the reservoir element is contained in an originally sealed cartridge which is unsealed in response to insertion into the instrument, and ink feeding relation is established between the reservoir element and the writing ball.

Other objects and advantages of the invention will be apparent upon reference to the following detail description taken in conjunction with the accompanying drawings wherein—

Figure 1 is a view of a writing instrument embodying the present invention, showing the holder or barrel in longitudinal section and the internal elements in elevation;

Figure 2 is a large scale, longitudinal sectional view of the pen of Figure 1;

Figure 3 is a still further enlarged longitudinal sectional view of the point assembly of the pen of Figures 1 and 2;

Figure 4 is a view taken on line 4—4 of Figure 3;

Figure 5 is a view taken on line 5—5 of Figure 3;

Figure 6 is an enlarged sectional view of the extreme tip portion of the writing point;

Figure 7 is a sectional view of the die for forming the seat member of the pen of Figures 1 to 6;

Figure 8 is a longitudinal sectional view of a portion of a ball point writing instrument having a seat made according to the present invention and being otherwise of conventional form;

Figure 9 is a view of a modified form of writing instrument showing the barrel in section and the cartridge in elevation;

Figure 10 is a large scale, longitudinal view partially in section and partially in elevation of the point assembly of the pen of Figure 9;

Figure 11 is a sectional view taken on line 11—11 of Figure 10;

Figure 12 is a view similar to Figure 10 but of a modified form of point;

Figure 13 is a view taken on line 13—13 of Figure 12;

Figure 14 is a view similar to Figures 10 and 12 but of a still further modified form of point;

Figure 15 is a view taken on line 15—15 of Figure 14;

Figure 16 is a view taken on line 16—16 of Figure 14;

Figure 17 is a sectional view taken on line 17—17 of Figure 14;

Figure 18 is a view similar to the extreme right-hand portion of Figure 14 but with a modified construction;

Figure 19 is a view of a still further modified form of pen showing the barrel in longitudinal section and the ink cartridge and internal elements in elevation;

Figure 20 is a longitudinal sectional view on a slightly enlarged scale of the unitary ink cartridge of Figure 19;

Figure 21 is an enlarged view of the forward portion of the pen of Figure 19 partially in elevation and partially in section; and Figure 22 is a view taken on line 22—22 of Figure 21.

Referring in detail to the drawings, attention is directed first to Figures 1 to 8 inclusive showing in detail the construction of the novel writing ball seat having particles of high melting point material embedded in an easily molded material, and a capillary reservoir element and feed means connecting the reservoir element and the writing ball.

The pen of Figure 1 made according to the present invention includes a barrel 12 having a reservoir section 14 open at both ends. A blind cap 16 is affixed to the rear end of the barrel, as by screw threads, and is vented at 18 for venting the interior of the reservoir section. Mounted in the forward open end of the barrel 12 is a point housing 20 secured in place as by friction, or by cement, etc. Removably mounted in the reservoir section 14 is a self-contained ink cartridge 22 which is of capillary nature as will be brought out in detail later, and connected to and leading forwardly from the cartridge 22 is feed means 24 made up, in the present instance, of two elements, a seat member 26 and a bushing or back-up sleeve 28. The feed means connects the ink cartridge 22 with the writing ball 30 for capillary feed of ink from the cartridge to the writing ball.

The ink cartridge 22 includes a capillary reservoir element and is designed for use with thin liquid ink of a viscosity similar to that of ordinary writing ink now used in fountain pens. The cartridge includes a casing 32 of any suitable material such as metal, and preferably of cylindrical form and removably fitted in the reservoir section 14. The casing has a rear end element 34 having a central aperture 36 and at the front end a flange 38 defining a central aperture for receiving the rear end of the back-up sleeve 28. Contained within the casing 32 is a capillary filler-and-reservoir element 40 which may be of any of several kinds but preferably is of the spiral-wrap type as disclosed and claimed in Bartell Patent No. 2,522,555, dated September 19, 1950. For convenience, the filler-and-reservoir element will be referred to simply as a reservoir element. Reference may be had to the Bartell patent for details of the reservoir element, but briefly it might be stated here that the element includes a sheet of material such as silver rolled into spiral form and provided with projections 42 which serve to space the convolutions apart. The spaces between the convolutions are of capillary dimension and interconnected by the openings through the projections. The reservoir element is capable of filling with ink by capillary action in response to being inserted therein, and of holding it by capillary action except when the ink feeds out, also by capillary action, in a writing operation. A central vent passage 44 is provided in the innermost convolution. At the ends of the spiral-wrap element 40 are separate elements 46 in engagement with the element 40 and serving as capillary leads or connectors from the element 40 to the feed means 24. This material 46 may be of a suitable felt made up of any type of fibres that are resilient, unbreakable and impervious to ink. The fibres are intertwined to form capillary spaces therebetween and serve as an extension of the element 40, and more particularly as a means that may be slightly compressed between the feed means 24 and the reservoir element upon insertion of the cartridge into the pen.

The feed means 24, as stated above, is made of two parts for convenience, but may, as far as the function of the pen is concerned after assembly, be considered as a single element. Referring particularly to Figures 3, 4 and 5, the seat member 26, which forms part of the feed means, is in the shape of a tube and has a bore 47 and a seat 48 surrounding the bore in which the writing ball 30 is mounted. The seat is formed by a forwardly opening socket.

The back-up sleeve or bushing 28 is threadedly secured in the point housing 20 and secures the seat member therein. The sleeve has a bore 49 forming an extension of the bore 47. The capillary feed means from the reservoir element in the cartridge 22 to the seat takes the form of channels or grooves 50, of capillary dimension, formed in the seat member 26 communicating with similar grooves 52 in the sleeve 28. The rear end of the bushing or sleeve 28 extends a short distance into the reservoir section 14 which is defined at its forward end by the rear portion of the point housing 20. The rear face of the sleeve or bushing 28 is provided with radial capillary grooves 56 communicating with and forming continuations of the grooves 52 through the annular rear end face of the bushing. Screw driver slots 58 may be provided in the bushing for assembling it in place in the housing. Preferably, the seat member 26 and sleeve 28 are provided with different numbers of grooves so that regardless of the relative angular positions of the two elements, there will be a substantial number of them in inter-communication, and so as to avoid the condition wherein the grooves in the two elements are all out of communication, as could be the case if the number of grooves in the two elements is the same. The grooves 50, 52 and 56 are preferably V-shaped.

As shown particularly in Figure 2, the ink cartridge 22, when inserted in the pen, receives the rear end of the bushing or sleeve 28 in a position wherein the rear end of the bushing engages and at least partially compacts the fibrous material 46 to establish capillary feed communication between the latter and the grooves 56. The ink feeds by capillary action from the element 40 to the pores in the material 46 and then to the grooves 56. The ink then flows to the grooves 52 and 50, and to the ball seat. The grooves are of such dimensions and shape that ink will feed by capillary action through the grooves in any position of the pen, even vertical, point-up position. The maximum dimension of the grooves is small, and since they are V-shape, as is preferable, the portions adjacent the floors of the grooves are of virtually unlimited capillarity.

The bores 49 and 47 surrounded by the grooves 52 and 50 are of greater than capillary dimension, and in the particular instance may be of the order of .030" in diameter; the grooves 50 and 52 are of proportionate size, and may be calculated from Figures 4 and 5 based on the diameter of the bore as above mentioned. The forward end of the bore 47 converges forwardly and hence the grooves 50 converge in a similar manner toward the ball seat 48. In the particular instance, the convergence of the seat member is accommodated by a forward decrease in depth of the grooves. These portions of the grooves exhibit an action, relative to the grooves in the cylindrical portion, that is similar to greater capillarity, and without analyzing the phenomenon, and for purposes of the invention may be considered greater capillarity; it was found, in a test, that when the inner end of the member 26 was inserted in a quantity of ink, the ink rose by capillary action in the grooves and when it reached the tapered portion, the rate of rise abruptly increased and continued at an increased rate to the ball seat.

The scalloped edge of the seat 48 formed by the grooves 50 provides a greater periphery to the opening to the seat relative to a smooth edge, and increases the effectiveness of the pen for working ink onto the ball. The grooves 50 provide an annular area in which the ink is deposited on the writing ball.

In the use of the pen, the cartridge when empty may be replaced by another filled one, or, the same empty cartridge may itself be refilled by removing the cap 16 and inserting the rear end of the reservoir element in a supply of ink.

Because of the relatively large dimension of the bore 47 as compared with the capillary grooves, any air that is pumped by the writing ball into the interior of the pen is enabled to escape through the central bore of the feed means and the central passage 44 of the reservoir means through the vent 18 of the pen barrel, to the exterior of the pen. The inner surface of the ball is thus vented to the exterior atmosphere directly rather than being vented thereto through an ink storage space. In a ball point writing instrument, of the prior art types, air is pumped by the writing ball through the seat and into the ink channels to the supply of ink in the reservoir. This is particularly true in the case of thin ink, but the construction of the present invention obviates the difficulties. In the present construction the ink flows by capillary action in the channels 50 to the writing ball and is deposited thereon from those channels, and the rear or inner surface of the writing ball is constantly vented to the exterior, through the vent passage mentioned, for enabling the escape of any air that may be pumped into the pen. The pen is entirely capillary in nature. None of the ink would have an opportunity to flow out of the pen through any openings into a person's pocket.

The seat member 26 in accordance with the principles of the invention is made up of (a) a material that has a relatively low melting or flow point, and (b) a material that has a melting point higher than the first embedded therein and forming a seat portion and surface. The former constitutes essentially the mass of the member—plastic, and more particularly nylon, has been found suitable for forming the mass of the member, and glass for the bearing-surface material. It will be understood, however, that these materials are exemplary only and other materials of similar nature may be utilized instead. Advantages of the seat member thus formed will be brought out more fully after the following description of the details of construction and method of making it.

The writing ball 30 may be, and preferably is, made of artificial sapphire, or corundum, which has suitable wear characteristics. The writing ball is preferably furthermore pitted for more effectively forming a film of ink thereon. The die 62 of Figure 7 is utilized in molding the seat member. The die has a cavity 64 into which the fluted core 66 is movable. In the molding operation the sapphire writing ball 30 is first deposited in the cavity and then the core 66 is lowered thereinto into engagement with the ball. A number of glass particles or beads 60 are deposited from a chute 68 (with the die head 70 raised), the deposition of the particles being controlled by a suitable feeding means. The glass particles or beads are deposited in sufficient numbers that they pile up against the writing ball 30 and the surrounding portion of the surface of the cavity. The lower end of the cavity is suitably shaped for receiving the ball and defining an annular area for retaining the glass beads in the desired shape of stack as well as to impart the desired shape to the finished seat member. The beads encircle the writing ball in a mass with a large number of them engaging the writing ball which are exposed through the surface of the completed seat, and since they rest against the surface of the cavity they are also exposed through the outer surface of the completed seat member. After so depositing the glass beads, the nylon or other plastic material to form the mass of the seat member is injected into the cavity by a suitable injector 72. The plastic (whether of thermo-plastic or thermo-setting type) on being injected into the die cavity fills the cavity, and is forced over, into, and around the glass beads 60 and into the lower end of the cavity as limited only by the engagement of the writing ball itself with the lower end of the cavity. Because the melting point of glass is much higher than that of plastic of the type here involved, the plastic does not bond to the glass beads. It is preferred that nylon having a practical molding temperature of between approximately 500° F. and 600° F. be employed. After the molding operation and withdrawal of the die head 70 and core 66, the molded article (i.e. the seat member with the glass beads therein), and the writing ball are together ejected as a unit from the die by the ejector 74. The seat member is then in the form shown in Figure 3 and is inserted in the point housing 20 (Figures 3 and 6). The glass particles may take any of various shapes. Because of ease in forming them, generally spherical beads are preferred, but in this case they may be roughened or brought out of true spherical shape so that they will not be rotated in the nylon in which they are embedded, in the completed seat member. It will be understood that sapphire has a high melting point and hence the nylon does not bond to the writing ball, and the ball can later readily be rotated in its socket in writing.

Nylon has certain characteristics that render it highly suitable for forming a ball seat. It is easily moldable and it has high wear resistance. The material can readily be molded and shaped to a ball to form the seat, and to the same writing ball that is to be incorporated in it in the completed pen. In fact it conforms so completely to the ball that there is less space than is desired between the surface of the seat so formed and the ball for ink to pass therethrough to form a film on the ball and be deposited on the paper. It is desired therefore to have a mat finish, and is accomplished by the glass particles. The nylon after cooling, pursuant to molding, shrinks, and that portion surrounding the particles, in shrinking, recedes from its outermost limits, but particularly from the seat surface formed; the glass particles, in the mass, retain their volume, and hence project through the seat surface and form lands and in that manner produce a mat surface. The depressions or pits between the lands provide for formation of a film encircling the ball that is carried out by the ball and deposited on the writing surface. This mat surface produces a film on a ball having a smooth surface, but the effect is much better if the ball also has a mat surface.

The glass particles reinforce the nylon and impart a certain degree of rigidity to it. The particles constitute a mass in which all adjacent particles abut, because of their stacked arrangement before the nylon is injected into the die, and the continuous abutment between the writing ball and the point housing 20 provides a degree of solidity or reinforcement not present in sheer nylon itself. It will be understood that the solidity is not absolute, but that there is some degree of resiliency remaining in the composite mass. The glass particles do not shrink or contract and hence the seat surface as defined by the mass of beads remains of accurate dimension after shrinkage of the nylon, and a possible shortcoming of nylon alone in this respect is obviated.

The point housing 20 is provided with a lip 76 extending forwardly of the equator of the writing ball for retaining the ball in the seat; the point housing is made of suitable material such as metal. The lower end of the die cavity 64 is conical and so dimensioned that the nylon extends down farther than the glass beads to form a lip 77 on the seat member. Fig. 6 clearly shows this feature of having the glass beads located intermediate the forward and rearward ends of the seat member 26. This lip is confined and supported by the lip 76 on the point housing. The lip 77 also extends beyond the equator of the writing ball and because of this fact and the fact the nylon shrinks on cooling, the lip retracts and resiliently engages and hugs the ball. The ball tends to produce a lapping action on the seat, but since the lip 77 hugs the ball it prevents formation of an opening around the ball and the entrance of foreign particles between the ball and seat and hence prevents additional lapping action. The resilient lip has the further advantage of retaining the ball seated on the seat, and in this manner reduces lapping action as compared to the condition wherein the ball would be free to float and lift off the seat since lapping would be increased by repeated lifting and seating.

A still further advantage is that entrance of air into the socket and ink passage is prevented, but the seriousness of this fact is reduced by the fact that provision is made for free venting of the pen from the inner surface of the ball to the exterior.

An added advantage is that the resilient lip, because it fits snugly to the ball, prevents gooping and weeping.

The glass beads 60 form a mass of material exposed not only through the seat 48 but through the outer surrounding surface of the seat member as well, where they engage the lip 76 of the point housing. Pressure applied to the writing ball as in a writing operation is transmitted to the seat surface 48 and while a portion of the pressure is applied to the plastic of the seat member, the greater part of the force is received by the mass of glass beads. The mass of beads is resisted by the mass of the plastic in rearward direction and by the point housing 20 in radial outward direction so that the glass beads are not displaced individually but partake of the mass of the plastic in the sense that when the force of the writing ball is transmitted to the seat member all portions thereof, if they tend to migrate at all, migrate as a mass.

The sapphire of the writing ball is harder than the glass of the beads in the seat, and consequently abrading action as between the two will take place principally, if not entirely, in the beads. Furthermore the nylon is resilient, at least to an extent, and because of this the abrading action on the beads is greater than it would otherwise be. It is preferred that as little as possible abrasive action take place on the writing ball so that it will retain its true sphericity and accurate dimension. The seat does wear in however, and it is even desired that it wear in to some extent, to accommodate itself to personal habits of the user. Notwithstanding the wearing-in action, the seat retains a mat finish.

While the quantity of glass particles utilized in the seat member may be as small or great as desired, a relatively large mass is preferred for the larger bearing surface it affords for the ball.

The seat member formed as disclosed herein is unusually inexpensive, both as to materials used and methods employed in forming it.

The provision of the back-up sleeve or bushing 28 as a separate element from the seat member (Figure 3) and threaded into the point housing 20 provides a means for accurately and completely locating the seat member 26 in the housing. By turning the sleeve in, the seat member 26 is forced down into the forward end of the point housing and particularly the lip 76 thereof for properly locating the point assembly, namely, the seat member and the writing ball, and maintaining its position for exposing the writing ball through the forward end of the point housing.

In constructing the seat member according to the foregoing, the provision of the relatively soft material, such as plastic, facilitates the formation of the capillary grooves 50 therein. The formation of the seat member, as by molding, so that the seat and capillary feed passages are formed in an integral element facilitates feeding and eliminates the edge effect found in instances of separate members at the edges of the passes.

While the foregoing has to do with the principles of the invention embodied in a capillary type writing instrument, the feature of the particles embedded in an easily moldable material seat member is also applicable to conventional ball point writing instruments. In this connection attention is directed to Figure 8 showing a ball point pen 78 having a conventional holder or barrel 80 and a writing unit 82. The writing unit may be mounted in any suitable manner, permanently, or removably and held in position as by friction, a movable unit in a retractable type, etc. The writing unit 82 includes a molded plastic seat member 84 with glass particles 86 embedded therein forming a seat in which the writing ball 88 is mounted. The seat member 84 is mounted in the point housing 90 having a lip 91 at its forward end retaining the ball in the seat. The seat member has a smooth central bore 92 forming the reservoir and filled with conventional ball point ink, such as thick pasty ink, and directly from which the ink feeds to the writing ball, with the ink forming an uninterrupted column from the ball rearwardly. In other words, the feature is not limited to a capillary type ball point writing instrument but may be included in a ball point pen which otherwise has heretofore been regarded as a conventional type instrument.

The writing instrument of Figures 9 to 11 is a capillary ball point writing instrument and is of the type having a removable writing unit including a writing point and ink reservoir element in the form of a self-contained cartridge. The pen is refillable merely by inserting an end of the cartridge in a supply of ink. The writing instrument of Figure 9 includes a barrel 94 provided with a blind cap 96 closing the rear open end of the barrel. The barrel has a reservoir section 98 in which the writing unit or cartridge 100 is removably mounted. The cartridge has a reservoir section of substantially cylindrical shape and a forward point section 104 having the writing ball 106 mounted therein and extending through a reduced bore 110. The blind cap 96 has a vent 112 for venting the cartridge which is itself vented at its rear end. The internal construction of the cartridge is shown in Figures 10 and 11 and includes a casing 114 which may be metal containing the spiral wrap reservoir element of the character referred to above. The forward end of the casing 114 is preferably tapered and provided with a forwardly extending reduced neck 118 in which the point housing 120 is mounted as by a press fit. In the point housing 120 is a seat member 122 similar in all material respects to the seat member 26. The point housing may be crimped at 124 for retaining the seat member in forward position.

The writing instrument of the present embodiment includes a different construction of feeding means for feeding ink by capillary action from the reservoir element 116 to the grooves 50 in the seat member 122. Several of the inner convolutions 125 of the reservoir element are extended forwardly through the point housing 120 into engagement with the rear end of the seat member 122, and the innermost one convolution 126 is extended into the seat member and engages or substantially engages the lands forming the grooves 50. The spaces between the convolutions form capillary ink storage cells which are interconnected, as pointed out above, and the space 127 just outwardly of the innermost convolution is in direct communication with the grooves 50. The extension of the innermost convolution 126 enhances the capillary characteristics of the grooves 50 in providing an inner surface thereto for the progression of ink through the grooves. In the present instance as in the previous embodiment the inner surface of the writing ball is vented to the exterior of the pen, through the bore of the seat member, and bore 128 in the reservoir element through the rear end of the cartridge and vent 112. The pen may be refilled by removing the cap 96 and inserting the rear end of the cartridge 100 in a supply of ink to an extent sufficient to bring the level of the ink into the cartridge and in engagement with the convolutions of the reservoir element. The ink then fills the reservoir element by capillary action, as described in connection with the Bartell patent referred to above.

The embodiment shown in Figures 12 and 13 includes a cartridge intended for inclusion in a pen barrel of the character shown in Figure 9 and constitutes a modification of the cartridge of Figures 9 to 11. In the cartridge of Figure 12 the seat member 129 actually forms the point member. This seat member has a forward end portion identical with the seat member 26 of Figure 2 and is extended rearwardly where it terminates in a flange or head 130 forming the forward end of the reservoir section of the cartridge. The latter includes the casing 132 containing a reservoir element 134 of suitable type, preferably of the spiral wrap type. The seat member 129 is provided with capillary grooves 136 equivalent to the grooves 50 leading from the seat rearwardly throughout the length of the seat member and continuing through radial grooves 138 formed in the rear end face of the flange or head 130. The rear end face of the flange or head is engaged by the forward end of the reservoir element 134 so that direct capillary communication is established between the spaces in the reservoir element and the radial grooves 138. Ink then progresses by capillary action into the grooves 138 and flows or passes from these grooves into the longitudinal grooves 136 to the seat. The grooves 138 are preferably V-shape, as are the grooves 136, to facilitate flow of ink around the convex corner between the two sets of grooves by capillary action. The forward end of the seat member 128 is enclosed in a point housing 140 serving to confine it and retain the writing ball in the seat. The point housing 140 need not extend the full length of the seat member and may be held in position on the seat member by crimping its rear end into the plastic of the seat member, as indicated at 142. The rear end of the casing 132 is, of course, vented and the cartridge may be included in a barrel such as 94 of Figure 9 and is refilled in a manner described in connection with the pen of Figures 9 to 11. The inner surface of the writing ball is similarly vented constantly to the exterior through the central bore or passage of the seat member, the central passage of the reservoir element and out through the rear end of the barrel.

Attention is directed next to Figures 14 to 17 inclusive showing another form of ink cartridge adapted for inclusion in a barrel similar to that of Figures 9 to 11. The cartridge of Figures 14 to 17 embodies a construction especially adapted to facility in manufacturing and includes a point member 144 made up of a forward seat member 145 (similar to the seat member 26) and a rearward point coupler 146. The seat member 145 is butted to the forward end of the point coupler and is surrounded by a point housing 148 which extends over and surrounds the forward end of the point coupler to which it is secured for mounting the seat member to the point coupler. The point coupler is of tubular form and extends rearwardly and terminates in a flange or head 150 to which the cartridge casing 152 is secured, the latter containing the spiral wrap reservoir 154 of the type referred to above which engages the rear end face of the flange or head 150. The point coupler 146 may be of any suitable material, such as metal, and as such is formed as a member separate from the seat member 26, the arrangement simplifying molding of the latter. The point coupler 146 has a smooth bore 156 of a diameter equivalent to the inner diameter of the seat member 26 as determined by the floors of the grooves 50. At the rear end of the bore 156 grooves 158, preferably V-shaped, are provided, extending only a short portion of longitudinal dimension of the member and continue into radial grooves 160 formed in the rear end face of the flange or head 150, the latter grooves similarly extending only a portion of the radial dimension of the head, to the end of facilitating fabrication of the member. Capillary ink feed relation is established between the spaces in the reservoir element 154 and the grooves 160 in the manner described above. In order to establish effective capillary ink feed from the grooves 158 to the grooves 50 in the seat member, the capillary connector tube 162 is interposed in the point coupler and seat member 145. This tube is of appropriate external diameter to engage the lands forming the grooves 158 as well as the lands forming the grooves 50 and is maintained in proper position by friction engagement with these lands. The tube extends from the rear end of the point coupler forwardly into the seat member to a position approximately where the bore of the seat member converges forwardly. The space 164 between the connector tube and bore 156 is of capillary dimension and constitutes a capillary feed segment between the grooves 158 and 50. The forward ends of the lands forming the grooves 158 are tapered as shown at 163 in Figure 14 and the ink in flowing forwardly can easily progress from the grooves 158 to the space 164 because of the tapered ends of the lands. Ink in the grooves at the portions thereof adjacent the connector tube progresses into the space between the inclined surfaces 163 and the connector tube, and this it does readily because this space at the rearward portion is small and diverges forwardly. Once the ink is in this space it progresses forwardly to the portion of greatest radial dimension. The ink then progresses forwardly in the space 164 to the grooves 50 where it enters into the grooves readily because of the lesser dimension of the grooves relative to the space 164.

The construction of Figure 18 illustrates a manner in which the casing of the cartridge may be secured to the point structure in a manner similar to Figure 10 but incorporating the groove feed means of Figure 14. In Figure 18 the point coupler 166 is provided with a tubular rear end portion 168 on which is fitted the neck 170 of the casing 172. This securement may be by suitable means such as a press fit. The forward portion of the casing 172 outwardly of the neck 170 is tapered at 174, the forward end of the reservoir element 176 being tapered correspondingly while the inner portion of the reservoir element engages the rear end of the point coupler. The rear end face of this point coupler is provided with capillary grooves 178 extending radially and continuing into longitudinal grooves 180 in the bore of the point coupler. These latter grooves extend only a short distance and the point coupler is provided with a connector tube 182 similar to and for the purpose of the connector tube 162 of Figure 14.

The pen or writing instrument of Figures 19 to 22 inclusive includes a throw-away cartridge construction, the instrument including a barrel having a point intended to be permanent and a replaceable ink cartridge. The writing instrument includes a barrel 184 having a reservoir section 186 and a reduced bore 188 at its forward end, and its open rear end closed by a blind cap 190 with a vent 192 venting the reservoir section. A barrel liner and protector 194 may be inserted in the reservoir section. The ink cartridge 196 is removably disposed in the reservoir section and is replaceable upon removal of the cap 190. The point structure 198 is relatively immovably fixed in the barrel (intended to be removed only by a repairman) and includes a seat member 199, similar to 26, point housing 200, back-up sleeve 202 and connector tube 204. The seat member 199 is contained in the point housing 200 in the manner described in connection with Figure 2, and the latter is fitted in the reduced bore 188. The back-up sleeve or bushing 202 is threaded at its forward end in the point housing 200 in position for engaging the seat member, and its rear end portion diverges rearwardly at 206 where it engages a complementary tapered surface 208 in the barrel. The sleeve is provided with an annular recess 210 for receiving a ring of rubber or rubber-like material 212 forming a sealing means and engaging the surface of the reservoir section of the barrel.

The connector tube 204 is split longitudinally (Figure 22) having a slot 214 of capillary dimension extending its full length. The connector tube is mounted in the back-up sleeve 202 with its forward end projecting into the seat member 199 and its rear end projecting rearwardly beyond the sleeve 202 and into the reservoir section. The tube is of somewhat resilient nature because of the slot and may be dimensioned to engage the surface of the bore in the sleeve for retaining it in position in the latter. The forward end engages or substantially engages the lands forming the grooves 50.

The cartridge 196 is shown as a whole in Figure 20 and constitutes a self-contained, originally sealed ink cartridge which can be handled without fear of losing ink therefrom, and upon insertion of it into the barrel, capillary communication is established between the ink reservoir element in the cartridge and the writing ball. The cartridge includes a casing 216 having an open forward end and a vent passage 218 in its otherwise closed rear end. Mounted in the casing is a capillary ink reservoir element 220, which is preferably of the spiral wrap form of the character referred to above. This reservoir element is of annular form and confined between two sealing rings or plugs 222 and 224. These plugs are of suitable resilient character, such as of plastic material. Each has a resilient skirt portion 226 capable of being flexed outwardly a limited amount. Inserted in the central bore of the reservoir element and fitted in the sealing plugs is a vent tube 228 engaged by the flanges 226. The front sealing plug may have a V-shaped bead 230 for sealing engagement with the sealing rubber ring 212 in the barrel.

In inserting the cartridge in the barrel, the cap on the barrel is removed and the front end of the cartridge inserted into the reservoir section. The vent tube 228 engages the connector tube 204 and upon further insertion the vent tube is displaced rearwardly by the connector tube to the dotted line position of Figure 20 (the rear end portion of the casing being suitably dimensioned for that purpose). The forward end of the vent tube is moved rearwardly of the front sealing plug 222 for exposing the reservoir element at its forward end, and the connector tube 204 enters into the reservoir element where the capillary slot 214 is brought into capillary feed engagement with the ink storage spaces in the reservoir element 220. The ink thus feeds by capillary action through the slot down to the forward end of the connector tube and into the grooves 50. The ink in the grooves feeds forwardly by capillary action in the manner described in connection with Figure 2 to the seat and ball. The bead 230 on the cartridge engages the rubber sealing ring 212 in the portion 202 and thus seals the interior of the cartridge at that position.

As in the case of the previous embodiment, the inner or rear surface of the writing ball is vented through to the exterior of the pen, being vented through the seat member 26, the connector tube 204 and vent tube 228. The capillary reservoir element 220 is also vented through the vent tube 228, the venting action taking place through that tube and into the connector tube 204 and through the slot 214 into the spaces in the reservoir element. The skirt portions 226 on the sealing plug 222 and 224 are of sufficient resiliency to effectively engage the vent tube 228 to seal the interior of the cartridge against leakage of ink so that the cartridge may be handled when out of the pen. It is not critical, however, that the flange 226 on the front sealing plug effectively engage the point connector tube 204, since the latter has the slot 214 therein, but this source of possible leakage is sealed by the engagement between the bead 230 and sealing ring 212. It is preferred that the flange 226 on the front sealing plug 222 be so dimensioned and have such resilience relative to the connector tube 204 that it does not have any adverse effect on the tube with respect to securement of the latter in the sleeve 202. In other words, the friction between the connector tube and sleeve 202 is such to the connector tube in position against the effect of the removal of the cartridge from the pen barrel. The rear end of the connector tube 204 need not come into actual contact with the convolutions of the reservoir element but need be positioned merely in proximity thereto such that the space between the tube and the inner convolution is of capillary dimension and such as to enable flow of ink from that space into the slot 214. It will be obvious that the cartridge may be retained in its ultimate intended position by any suitable means, such as by engagement of the cap 190, the parts being appropriately dimensioned to accomplish that purpose.

I claim:
1. A ball point writing instrument comprising: a barrel; a tubular seat member mounted in said barrel, said tubular seat member terminating at its forward end in an annular seating surface of semispherical concave shape; said tubular seat member consisting of a tube of relatively soft, low melting point material having fixedly embedded therein a plurality of spheres of a relatively hard, high melting point material, said spheres being exposed in and forming a part of said annular seating surface intermediate the rearward inner end and the forward outer end of said annular seating surface; a writing ball mounted in said seating surface, said ball being of a material harder than the material of said spheres and the material of said tube; reservoir means in the barrel; and means for establishing ink feed from the reservoir means to the ball.

2. A tubular seat member for seating the writing ball of a ball point writing instrument, said tubular seat member terminating at its forward end in an annular seating surface of semispherical concave shape, said tubular seat member consisting of a tube of relatively soft, low melting point material having fixedly embedded therein a plurality of spheres of a relatively hard, high melting point material, said spheres being exposed in and forming a part of said annular seating surface intermediate the rearward inner end and the forward outer end of said annular seating surface.

3. A ball point writing instrument comprising: a barrel; a tubular seat member mounted in the barrel, said tubular seat member terminating at its forward end in an annular seating surface of semispherical concave shape; a writing ball rotatably mounted in said annular seating surface; capillary reservoir means in the barrel capable of containing thin liquid ink by capillary action and releasing by capillary action; said tubular seat member having in its bore longitudinal capillary channels connecting the reservoir means with the annular seating surface and the ball; said bore being of greater than capillary dimension with respect to said ink; and means venting said bore directly to atmosphere thereby exposing and venting the inner surface of the writing ball directly to atmosphere.

References Cited in the file of this patent

UNITED STATES PATENTS

| | | |
|---|---|---|
| 1,485,181 | Grund | Feb. 26, 1924 |
| 2,345,305 | Thornton | Mar. 28, 1944 |
| 2,480,048 | Rice | Aug. 23, 1949 |
| 2,536,124 | Bolvin et al. | Jan. 2, 1951 |
| 2,651,079 | Michaelson et al. | Sept. 8, 1953 |
| 2,660,151 | Smith et al. | Nov. 24, 1953 |
| 2,663,891 | Hanryon | Dec. 29, 1953 |
| 2,691,801 | Robb | Oct. 19, 1954 |
| 2,704,533 | Spallini | Mar. 22, 1955 |
| 2,847,975 | Lawton | Aug. 19, 1958 |

FOREIGN PATENTS

| | | |
|---|---|---|
| 935,742 | France | Feb. 9, 1948 |
| 435,349 | Italy | May 17, 1948 |
| 436,063 | Italy | June 1, 1948 |
| 965,583 | France | Feb. 22, 1950 |
| 969,613 | France | May 24, 1950 |
| 1,042,448 | France | June 3, 1950 |
| 822,364 | Germany | Nov. 26, 1951 |
| 818,317 | Germany | Dec. 20, 1951 |
| 828,209 | Germany | Jan. 17, 1952 |
| 1,024,956 | France | Jan. 21, 1953 |
| 513,137 | Belgium | Jan. 26, 1953 |
| 1,035,935 | France | Apr. 22, 1953 |